United States Patent
Tomi

(10) Patent No.: US 8,670,138 B2
(45) Date of Patent: Mar. 11, 2014

(54) INFORMATION PROCESSING APPARATUS, PRINTING APPARATUS, AND MONITORING METHOD

(75) Inventor: Hideyasu Tomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/475,060

(22) Filed: May 18, 2012

(65) Prior Publication Data

US 2012/0327452 A1 Dec. 27, 2012

(30) Foreign Application Priority Data

Jun. 24, 2011 (JP) ................................. 2011-140880

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC ........................................ 358/1.14; 358/1.15

(58) Field of Classification Search
None
See application file for complete search history.

(56) References Cited

U.S. PATENT DOCUMENTS

2005/0165675 A1* 7/2005 Fujita .............................. 705/39
2013/0117518 A1* 5/2013 Kobayashi .................... 711/162

FOREIGN PATENT DOCUMENTS

JP 2010-039519 A 2/2010

* cited by examiner

*Primary Examiner* — Douglas Tran
(74) *Attorney, Agent, or Firm* — Canon USA, Inc., IP Division

(57) ABSTRACT

An information processing apparatus includes a control unit to perform control and a communication control unit to operate as a normal mode for transmitting and receiving information concerning the information processing apparatus. At a time of startup of the information processing apparatus, the control unit executes a plurality of processing, and writes information indicating that processing has been completed each time processing is completed. At the time of startup, an operation mode of the communication control unit is shifted to a monitoring mode wherein the communication control unit monitors occurrence of abnormality based on presence/absence of information indicating that processing has been completed. In response to abnormality having occurred, the communication control unit outputs occurrence of the abnormality. In response to certain information being written into the predetermined storage area, the operation mode of the communication control unit is shifted to the normal mode from the monitoring mode.

9 Claims, 15 Drawing Sheets

FIG.5

| STOPPED STEP | FAILED COMPONENT (1) | FAILED COMPONENT (2) | FAILED COMPONENT (3) |
|---|---|---|---|
| STEP 1 | ID1: CPU | ID3: BOOT ROM | |
| STEP 2 | ID2: MAIN MEMORY | | |
| STEP 3 | ID4: STORAGE DEVICE | | |
| STEP 4 | ID4: STORAGE DEVICE | | |

FIG.10

| STOPPED STEP | FAILED COMPONENT (1) | FAILED COMPONENT (2) | FAILED COMPONENT (3) |
|---|---|---|---|
| STEP 1 | ID2: MAIN MEMORY | | |
| STEP 2 | ID4: STORAGE DEVICE | | |
| STEP 3 | ID4: STORAGE DEVICE | | |

FIG.14

ERROR REPORT

TROUBLE HAS OCCURRED IN THE MIDDLE
OF STARTUP OF PRINTING APPARATUS,
AND THE APPARATUS COULD NOT
BE NORMALLY STARTED UP.

[TROUBLE INFORMATION]
STEP IN WHICH TROUBLE HAS OCCURRED: STEP 1
COMPONENTS IDs WITH FAILURE POSSIBILITY: ID1, ID3

PLEASE CONTACT THE FOLLOWING CONTACT NAME:

PRINTING APPARATUS MANAGEMENT CO., LTD,
TEL NO.: 123-456-789
PERSON IN CHARGE: MR. SUZUKI

INFORMATION PROCESSING APPARATUS, PRINTING APPARATUS, AND MONITORING METHOD

BACKGROUND OF THE INVENTION

1. Field of the Invention

The present invention relates to a technique for managing information such as an error which has occurred before an information processing apparatus is normally started up.

2. Description of the Related Art

A trouble may occur during a period until startup as usual is completed, at a time of startup of an information processing apparatus such as a personal computer (PC). In many such cases, a user of the information processing apparatus cannot recognize why the information processing apparatus fails to start up.

Further, when a trouble has occurred during startup of the information processing apparatus, a user of the information processing apparatus often gets into a situation where it is hard to take appropriate response, for example, operation is disabled, or display is not normally performed, despite the power has been turned on.

Thus, Japanese Patent Application Laid-Open No. 2010-039519 discusses a technique for monitoring a trouble which occurs during the startup of the information processing apparatus, and notifying an administrator of the content thereof via an external network, by providing a dedicated monitoring control unit for monitoring the status of the apparatus until it is normally started up.

However, as described in Japanese Patent Application Laid-Open No. 2010-039519, if the dedicated monitoring control unit for monitoring the status of the apparatus is provided, cost of operating the information processing apparatus will increase. Further, after the startup is completed, functions or resources of the monitoring control unit will become useless.

SUMMARY OF THE INVENTION

The present invention is directed to an information processing apparatus, a printing apparatus, and a monitoring method capable of monitoring a trouble which occurs during startup, without having a dedicated monitoring control unit, and notifying an administrator of the content thereof.

According to an aspect of the present invention, an information processing apparatus includes a control unit configured to perform control of entire information processing apparatus, and a communication control unit configured to operate as a normal mode for transmitting and receiving information concerning the information processing apparatus via a network, wherein, at a time of startup of the information processing apparatus, the control unit executes sequentially, a plurality of processing which the control unit should perform at the time of startup, and writes information indicating that processing has been completed into a predetermined storage area each time processing is completed, wherein, at the time of startup of the information processing apparatus, an operation mode of the communication control unit is shifted to a monitoring mode, wherein the communication control unit, which has been shifted to the monitoring mode, monitors occurrence of abnormality at the time of startup, based on presence/absence of writing of information indicating that processing to be executed last among the plurality of processing has been completed, into the predetermined storage area, wherein, in response to abnormality having occurred, the communication control unit, which has been shifted to the monitoring mode, outputs occurrence of the abnormality to a network, and wherein, in response to information, which indicates that processing to be executed last among the plurality of processing has been completed without occurrence of any abnormality, being written into the predetermined storage area, the operation mode of the communication control unit is shifted to the normal mode from the monitoring mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a list illustrating a relationship between a stopped step and failure parts IDs according to an exemplary embodiment.

FIG. 10 is a list illustrating a relationship between stopping step and failure parts IDs according to the second exemplary embodiment.

FIG. 14 is a print example of trouble information according to the third exemplary embodiment.

DESCRIPTION OF THE EMBODIMENTS

Various exemplary embodiments, features, and aspects of the invention will be described in detail below with reference to the drawings.

Figure 1:
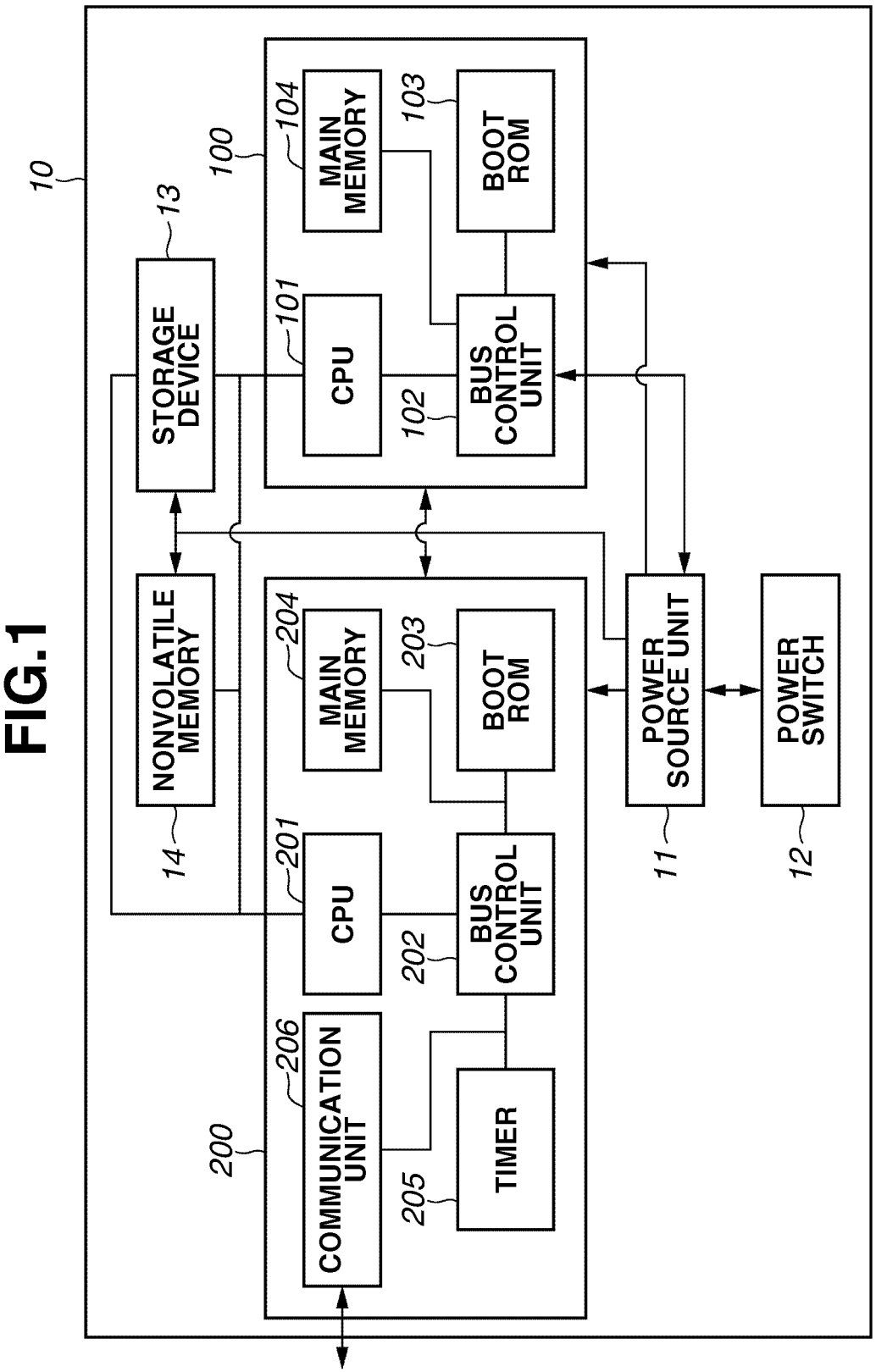
FIG. 1 is a block diagram illustrating a hardware configuration of an information processing apparatus according to an exemplary embodiment.

FIG. 1 illustrates an example configuration of an information processing apparatus 10 according to an exemplary embodiment. Here, specific examples of the information processing apparatus include a general-purpose PC, a printing apparatus, and an image forming apparatus such as a copying machine connectable to a network, as information processing terminals described below. In FIG. 1, descriptions are made to omit configuration such as a printing control unit, a printer unit, and a scanner unit with which the image forming apparatus is provided.

The information processing apparatus 10 in FIG. 1, includes a total control unit 100 that includes a central processing unit (CPU), a memory, and the like, and a communication control unit 200 that performs transmission and reception of information with an external network using, for example, Ethernet (registered trademark).

Also, the information processing apparatus 10 includes a power source unit 11 that supplies power to respective units within the information processing apparatus 10, a power switch 12 that accepts power-on operation by a user, and a storage device 13 that includes a hard disk drive (HDD) and the like.

Further, the information processing apparatus 10 includes a nonvolatile memory 14 for storing data which is notified to the communication control unit 200 during startup of the total control unit 100. Further, dotted lines in FIG. 1 represent power source lines for supplying power to the respective components.

The total control unit 100 performs a total control of the apparatus, and includes a CPU 101 that performs arithmetic processing and the like, and a bus control unit 102 that controls an address bus and a data bus.

Further, the total control unit 100 includes a boot read only memory (ROM) 103 that stores therein a total control unit boot program (not illustrated), and a main memory 104, and the respective units are connected to one another via a bus. In FIG. 1, only the data bus is illustrated.

The total control unit boot program stored in the boot ROM 103 is used to perform initialization of respective units of hardware in the information processing apparatus 10, and loading of an operating system (OS). Further, in the boot program, when a predetermined step has been reached, data to identify a step that has reached a predetermined area of the nonvolatile memory 14, is written. The data may be written into the storage device 13, or may be directly notified to the communication control unit 200.

The main memory 104 is a random access memory (RAM), and is a work memory of the CPU 101.

The communication control unit 200 includes a CPU 201 that performs arithmetic processing or the like, and a bus control unit 202 that controls an address bus and a data bus. Further, the communication control unit 200 includes a boot ROM 203 that stores therein a communication control unit boot program (not illustrated), a main memory 204, a timer 205, and a communication unit 206, and the respective units are connected to one another via a bus. In FIG. 1, only data bus is illustrated.

A boot program stored in the boot ROM 203 is used to perform initialization of respective units of hardware in the communication control unit 200 and loading of the OS. The main memory 204 is a random access memory (RAM), and is a work memory of the CPU 201.

The timer 205 has a function of performing notification to the CPU 201 after a certain period of time has elapsed. The communication unit 206 has functions of performing protocol conversion to adjust external networks (e.g., Ethernet (registered trademark)), and performing transmission and reception of data. The communication control unit 200, as a normal mode, performs transmission and reception of information concerning the apparatus via the communication unit 206.

The information processing apparatus 10 holds in the nonvolatile memory 14 information, for example, Internet Protocol (IP) address, for performing communication with a terminal (a local monitoring terminal 301 illustrated in FIG. 2) to which an error occurred during startup of the total control unit 100 is notified. The information may be held in other devices such as the storage device 13.

Figure 2:
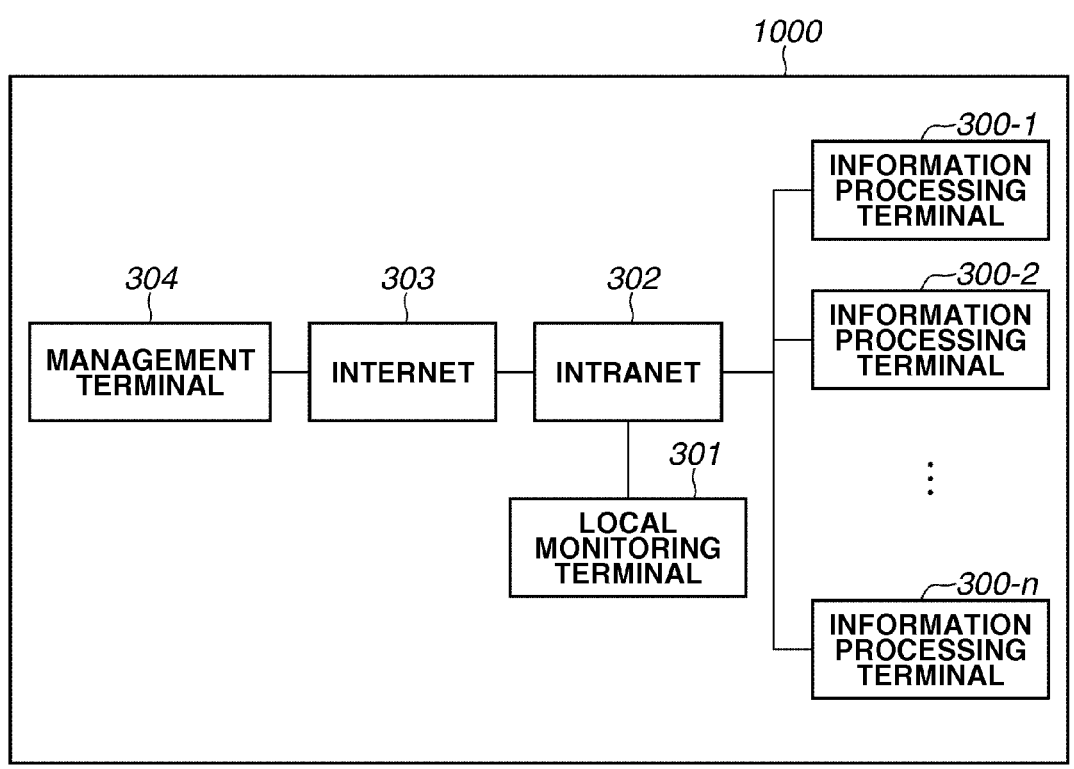
FIG. 2 is a block diagram illustrating a hardware configuration of a communication system according to an exemplary embodiment.

FIG. 2 illustrates an example configuration of a communication system 1000 using the information processing apparatus in the present exemplary embodiment. The communication system 1000 includes information processing terminals 300-n (n=1, 2, . . . ) to which the information processing apparatus in the present exemplary embodiment is applied, the local monitoring terminal 301, an intranet 302, an Internet 303, and a management terminal 304. A plurality of points including the information processing terminals 300-n, the local monitoring terminal 301, and the intranet 302 may be connected to one management terminal 304.

The local monitoring terminal 301 is connected with the information processing terminals 300-n via the intranet 302, collects information of the information processing terminals 300-n, and sends the information to the management terminal 304 via the Internet 303.

The collected information includes operation mode settings, operation logs, trouble information of the information processing terminals. The trouble information includes information indicating whether a trouble has occurred during the startup, and information of a step at which an error has occurred, for example. Hereinbelow, these pieces of information are referred to as maintenance information.

For communication with the information processing terminals 300-n, from the local monitoring terminal 301, there are two types of communication formats. One method is an information collection method for performing polling using a simple network management protocol (SNMP) or a unique protocol from the local monitoring terminal 301 to the information processing terminals 300-n. Another method is a method for collecting information by the local monitoring terminal 301 providing Web services or services using the unique protocol, and receiving information sent from the terminals.

The management terminal 304 is a terminal managed by a provider, and has a function of receiving information (maintenance information) such as working statues of the information processing terminals from a plurality of local monitoring terminals and analyzing the information.

The local monitoring terminal 301 includes a communication control unit 405, a storage device 406, an input control unit 407, in addition to a CPU 401, a bus control unit 402, a ROM 403, and a main memory 404.

Figure 3:
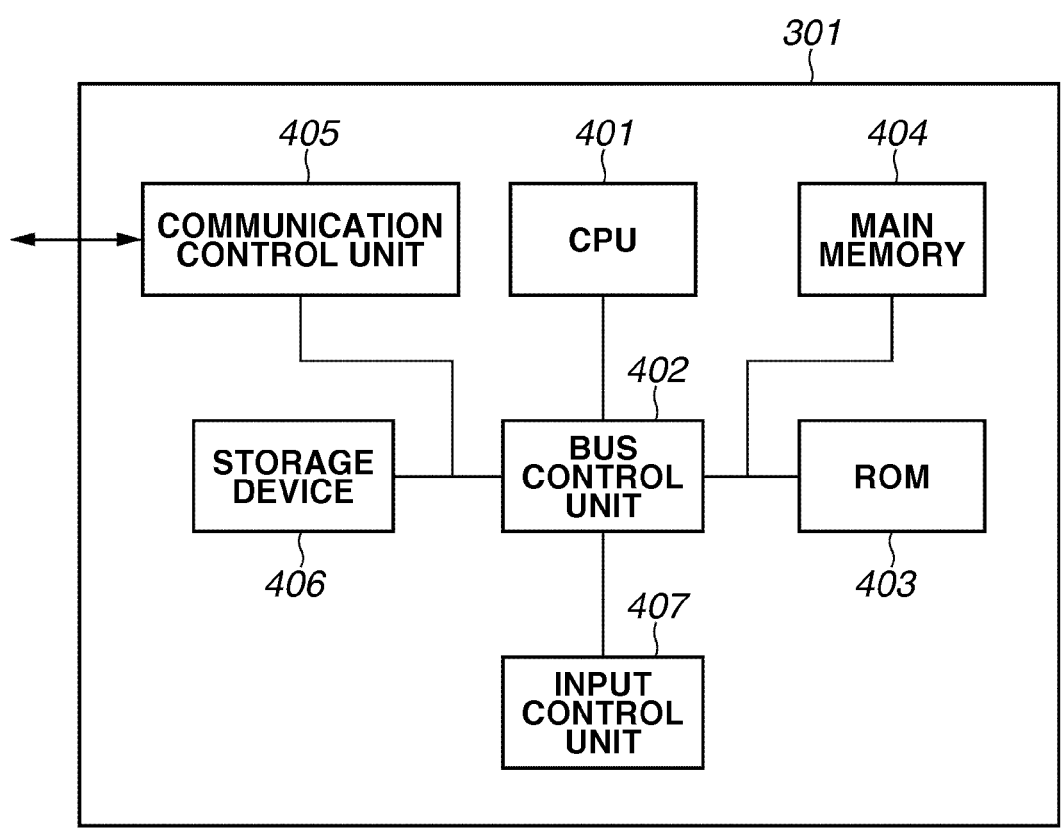
FIG. 3 is block diagram illustrating a hardware configuration of a local monitoring terminal according to an exemplary embodiment.

The bus control unit 402 is a common signal path through which data is passed between parts constituting the local monitoring terminal 301 in FIG. 3. The main memory 404 is a storage device that can electrically store and rewrite information, and acquired data and data to be transmitted are loaded there, and are subjected to data conversion into a predetermined format.

The storage device 406 is a nonvolatile storage device that can electrically rewrite information, and store the information even when power source is turned off. In the storage device 406 stored are, in addition to an OS for performing control of hardware, a list of the information processing terminals 300-n which become monitoring targets on which the local monitoring terminal 301 performs monitoring, and an access program for acquiring maintenance information from the information processing terminals 300-n.

Also, a resident program for receiving the maintenance information from the information processing terminals 300-n, a notification program for notifying the management terminal 304 of the acquired maintenance information are also stored therein.

The communication control unit 405 is an interface for performing information exchange with the external network. The CPU 401 is used to perform total control of the local monitoring terminal 301, and collects the maintenance information of the information processing terminals 300-n via the communication control unit 405, based on a program and a schedule stored in the storage device 406. The local monitoring terminal 301 includes two types of communication methods for maintenance information acquisition.

One method is a communication method for performing polling for the information processing terminals 300-n at a predetermined scheduled time of day, based on its own monitoring program, and acquiring the maintenance information. Further, another method is a communication method for acquiring the maintenance information transmitted from the information processing terminals 300-n, by activating the resident program and providing a network service.

In a case of performing the polling, by the CPU 401 executing at a predetermined schedule an access program to the information processing terminals 300-n recorded on the storage device 406, the maintenance information is acquired via the communication control unit 405. The acquired maintenance information is loaded in the ROM 404, and converted into a predetermined format and recorded onto the storage device 406.

Further, in a case of providing a network service, a service for accepting communication processing of the information processing terminals 300-n from the communication control unit 405 is started, by the CPU 401 executing the resident program recorded on the storage device 406.

When the information processing terminals 300-n transmits the maintenance information to the local monitoring terminal 301 according to a predetermined program processing, the local monitoring terminal 301, through this service, loads the maintenance information into the main memory 404, and converts it into a predetermined format and records it onto the storage device 406.

The maintenance information collected through respective communication methods is notified to the management terminal 304 via the communication control unit 405, by processing a notification program that is recorded on the storage device 406 and is used to notify the maintenance information to the management terminal 304. In the present exemplary embodiment, when trouble information is included in the maintenance information collected from the information processing terminals 300-n, which are the monitoring targets, the trouble information is to be immediately notified to the management terminal 304.

The hardware configuration of the management terminal 304 is identical to that of the local monitoring terminal 301, and thus descriptions thereof will not be repeated. The management terminal 304 can execute various service functions. For example, as the service functions, a service for creating a report which summarizes working statuses of the information processing terminals 300-n is included.

A communication control unit (not illustrated) of the management terminal 304 receives maintenance information to be notified from the local monitoring terminal 301, and stores the maintenance information in a storage device (not illustrated). In the storage device (not illustrated) of the management terminal 304, the maintenance information to be notified from the local monitoring terminal 301 is stored, in addition to the OS which performs control of hardware. Further, in the management terminal maintenance information, client information corresponding to the local monitoring terminal 301 is stored.

The client information includes, for example, contact information of clients such as addresses of electronic mails. In addition, a correspondence list between trouble information and parts with a failure possibility is also stored therein. The correspondence list will be described below in detail.

Figure 6:
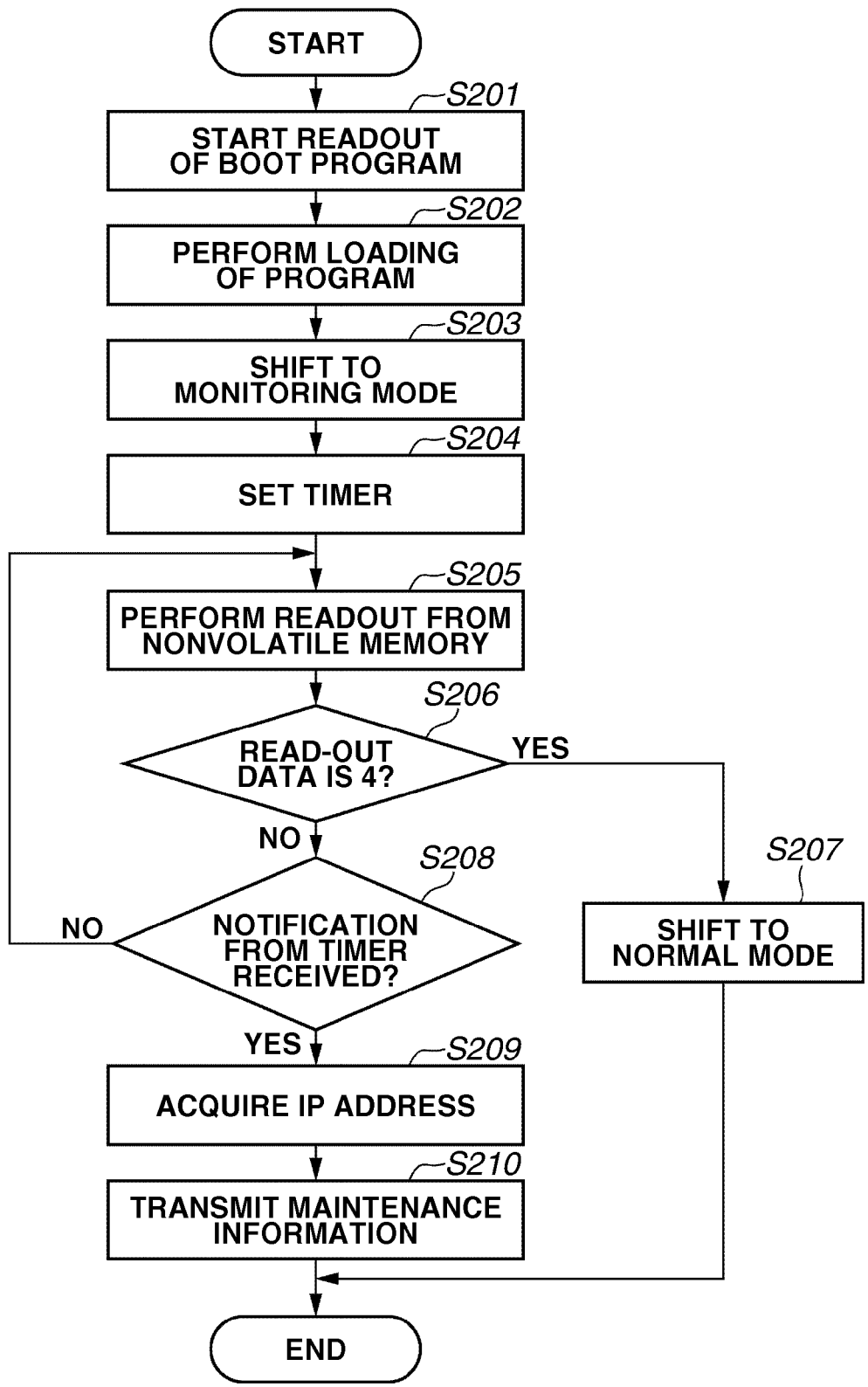
FIG. 6 is a flowchart illustrating an operation of a communication control unit according to the first exemplary embodiment.

Hereinbelow, an operation in a case where a trouble has occurred in the total control unit 100 when power is supplied to the information processing terminal 300-1 will be described in detail with reference to FIG. 4, FIG. 6 and FIG. 7. When the power switch 12 is turned on, the power source unit 11 is notified, and the power source unit 11 supplies power to respective components. When the power is supplied, the total control unit 100 and the communication control unit 200 starts startup processing.

First, referring to FIG. 4, the startup processing of the total control unit 100 will be described. FIG. 4 illustrates a flowchart relating to the startup processing of the total control unit 100.

When the power is supplied, in step S101, the CPU 101 of the total control unit 100 starts to read out a boot program stored in the boot ROM 103. As described above, the CPU 101 performs initialization of the entire information processing apparatus according to the boot program, and performs loading of the OS. In the present exemplary embodiment, the boot program is divided into four steps, and when each step ends, writing into the nonvolatile memory 14 is performed.

Each of the four steps will be described. In step 1, initialization of the inside of the CPU 101 is performed. In step 2, initialization of the main memory 104 is performed. In step 3, initialization of the storage device 13 is performed. In step 4, loading of the OS is performed from the storage device 13.

By dividing the startup processing into four steps, in this way, correspondence between a stopped step and a part with a failure possibility is made clear. A correspondence list between the stopped steps and parts IDs with a failure possibility is illustrated in FIG. 5.

In step S102, the CPU 101 executes step 1. When step 1 ends, then in step S103, the CPU 101 writes predetermined data (for example, 1) in a predetermined area (for example, address 0) of the nonvolatile memory 14. Next, in step S104, the CPU 101 executes step 2.

When step 2 ends, in step S105, the CPU 101 writes predetermined data (for example, 2) in a predetermined area (for example, address 0) of the nonvolatile memory 14. Next, in step S106, the CPU 101 executes step 3. When step 3 ends, in step S107, the CPU 101 writes predetermined data (for example, 3) in a predetermined area (for example, address 0) of the nonvolatile memory 14.

Next, in step S108, the CPU 101 executes step 4. When step 4 ends, in step S109, the CPU 101 writes predetermined data (for example 4) in a predetermined area (for example, address 0) of the nonvolatile memory 14. When step 4 ends, the startup processing of the total control unit 100 is completed.

Further, in a case where normal end is not attained ("NG" in FIG. 4), in all steps, the CPU 101 cannot end the startup processing and goes into an abnormal end.

Next, referring to FIG. 6, the startup processing of the communication control unit 200 will be described. FIG. 6 illustrates a flowchart relating to the startup processing of the communication control unit 200.

When the power is supplied, in step S201, the CPU 201 of the communication control unit 200 starts to read out a boot program stored in the boot ROM 203. Next, in step S202, the CPU 201 performs initialization inside the communication control unit 200 according to the boot program, and performs loading of the program. Thereafter, in step S203, the communication control unit 200 is shifted to an operation mode called a monitoring mode in the present exemplary embodiment.

The communication control unit 200 operates in this monitoring mode until the startup processing of the total control unit 100 is completed. After the startup processing has been completed, the communication control unit 200 operates in an operation mode (normal mode) for performing normal communication control.

When the CPU 201 is shifted to the monitoring mode, in step S204, the timer 205 is set to perform notification to the CPU 201 after a predetermined time has elapsed. In the present exemplary embodiment, the predetermined time to be set for the timer 205 is made sufficiently longer than the time taken for the total control unit 100 to complete the startup.

Accordingly, if the startup processing of the total control unit 100 has not been completed by the time a notification arrives from the timer 205, it can be determined that a trouble has occurred. Alternatively, the predetermined time to be set for the timer 205 may be made shorter than a time for the total control unit 100 to complete startup, and when notifications arrive a predetermined number of times, it may be determined that a trouble has occurred in the total control unit 100.

Next, in step S205, the CPU 201 reads out a predetermined area (for example, address 0) of the nonvolatile memory 14. The address to be read out is identical to an address which the CPU 101 of the total control unit 100 performs writing during the startup processing.

As a method for identifying an address to be read out, an address for accessing is written in another area of the nonvolatile memory 14 and the CPU 101 and the CPU 201 may read out the address, or an address for accessing to the program itself may be written in advance.

In step S206, the CPU 201 analyzes read-out data, and checks to which step the startup processing of the total control unit 100 has progressed. More specifically, if the read-out data is 1, it can be determined that startup processing of the total control unit 100 has completed step 1.

Similarly, in the present exemplary embodiment, the data to be written is 4 when the startup processing of the total control unit 100 has been completed. Thus, in step S206, the CPU 201 determines whether the read-out data is 4. If the read-out data is 4 (YES in step S206), the CPU 201 can determine that the startup processing of the total control unit 100 has been completed. Thus, in step S207, the CPU 201 shifts the operation mode from the monitoring mode to the normal mode, and completes the startup processing of the communication control unit 200.

On the other hand, if the read-out data is not 4 (NO in step S206), in step S208, the CPU 201 determines whether a notification from the timer 205 is received. If notification has not been received (NO in step S208), the processing returns to step S205. On the other hand, if a notification has been received (YES in step S208), the CPU 201 determines that a trouble has occurred during the startup of the total control unit 100.

At this time, in step S209, the CPU 201 first reads out a predetermined area (for example, address 4) of the nonvolatile memory 14, and acquires an Internet Protocol (IP) address of the local monitoring terminal 301. Next, in step S210, the CPU 201 transmits maintenance information including the data indicating to which step the startup processing read out in step S206 has progressed, to the local monitoring terminal 301 via the communication unit 206 using the IP address acquired in step S209.

As described above, the local monitoring terminal 301, upon receiving the maintenance information including information indicating that a trouble has occurred during the startup, from the information processing apparatus 300-n, notifies the management terminal 304 accordingly.

Figure 7:
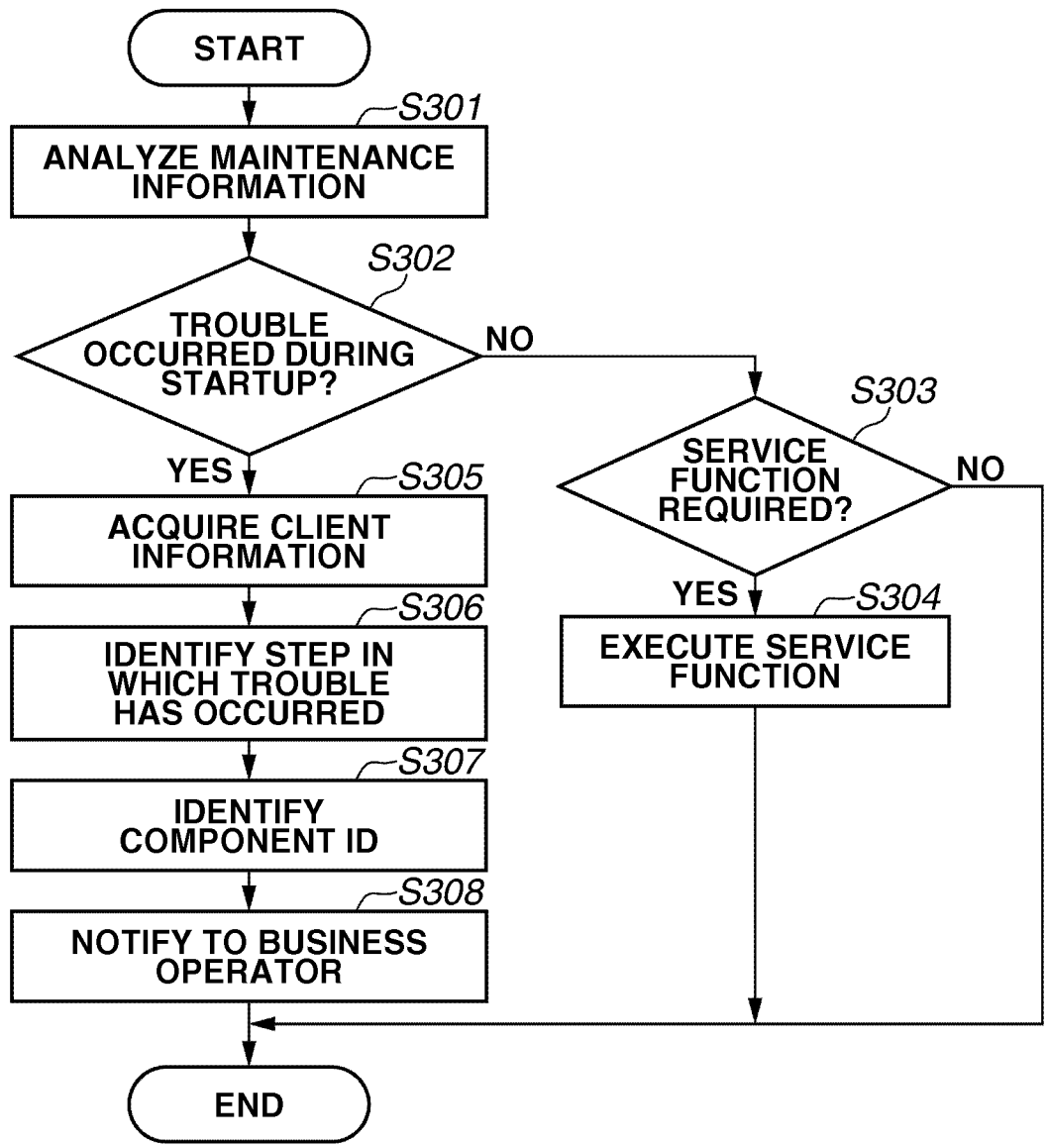
FIG. 7 is a flowchart illustrating an operation of a management terminal according to the first exemplary embodiment.

FIG. 7 illustrates a flowchart illustrating the processing when receiving the maintenance information of the management terminal 304.

In step S301, the management terminal 304 which has received the maintenance information analyzes the maintenance information. In step S302, the management terminal 304 determines whether information indicating that a trouble has occurred during the startup is included in the maintenance information. If trouble information is not included (NO in step S302), in step S303, the management terminal 304 determines whether the maintenance information requires a service function of the management terminal 304. If the service function is required (YES in step S303), in step S304, the management terminal 304 executes a predetermined service function. If the service function is not required (NO in step S303), the processing ends.

If information indicating that a trouble has occurred during the startup is included in the maintenance information (YES in step S302), in step S305, the management terminal 304, referring to information which identifies the local monitoring terminal 301 included in the maintenance information, acquires corresponding client information. Next, in step S306, the management terminal 304 acquires data indicating the step at which the trouble has occurred, included in the maintenance information.

Next, in step S307, the management terminal 304, referring to a correspondence list between stopped steps and part IDs with a failure possibility, identifies a part ID corresponding to the information included in the maintenance information. In step S308, the information indicating that a trouble has occurred and the identified part IDs are notified using, for example, electronic mails to a provider which is in charge of a point (client) where the local monitoring terminal 301 is installed.

Furthermore, not only the part IDs are notified, but also an order may be placed for the parts corresponding to the part IDs. In addition, a user who is using the information processing terminal 300-n of the point, or an administrator of the point may be notified using, for example, electronic mails.

As described above, by providing two operation modes of the monitoring mode and the normal mode in the communication control unit 200, it becomes possible to monitor a trouble which occurs during the startup, and to notify an administrator of the content thereof, without having a dedicated monitoring control unit therein.

As a matter of course, the present exemplary embodiment can be implemented even if the local monitoring terminal does not exist as a configuration of the communication system 1000. More specifically, the information processing terminal 300-n holds an IP address of the management terminal 304 in the nonvolatile memory 14, and notifies the maintenance information to the IP address when a trouble has occurred.

Further, as a notification method to the management terminal 304, the information processing terminal 300-n can also notify the management terminal 304 in the following method, instead of directly notifying the management terminal 304. The information processing terminal 300-n notifies that a trouble has occurred in itself, and the startup has failed to the same subnet. Other information processing terminal 300-*m* that has received the notification notifies it to the management terminal 304.

Hereinbelow, a second exemplary embodiment will be described with reference to FIG. 8 and FIG. 9. In the present exemplary embodiment, an example of processing for notifying a trouble which occurs when the information processing apparatus 10 is shifted to the normal power mode from the power-saving mode, is described in addition to a monitoring technique during power-on according to the first exemplary embodiment.

The power-saving mode in the present exemplary embodiment will be described. During the power-saving mode, power supply to the total control unit 100 and the storage device 13 is not performed, and thus electric power consumed by the information processing apparatus 10 as a whole is reduced. By performing power supply to the communication control unit 200 even during the power-saving mode, communication with an external network can be maintained. Further, since electric power consumed by the communication control unit 200 is small, power-saving of the information processing apparatus 10 as a whole becomes possible.

Further, the information processing apparatus 10 will be returned to the normal power mode in response to predetermined conditions being satisfied in a state where it has been shifted to the power-saving mode. Among the predetermined conditions is that a packet which conforms to the conditions for returning to the normal power mode is received from a network. In order to receive such a packet, electric power is supplied to the communication control unit 200 even when it is shifted to the power-saving mode.

In the present exemplary embodiment, configurations of the information processing apparatus 10, the communication system 1000, the local monitoring terminal 301, and the management terminal 304 are identical to those in the first exemplary embodiment.

Figure 8:
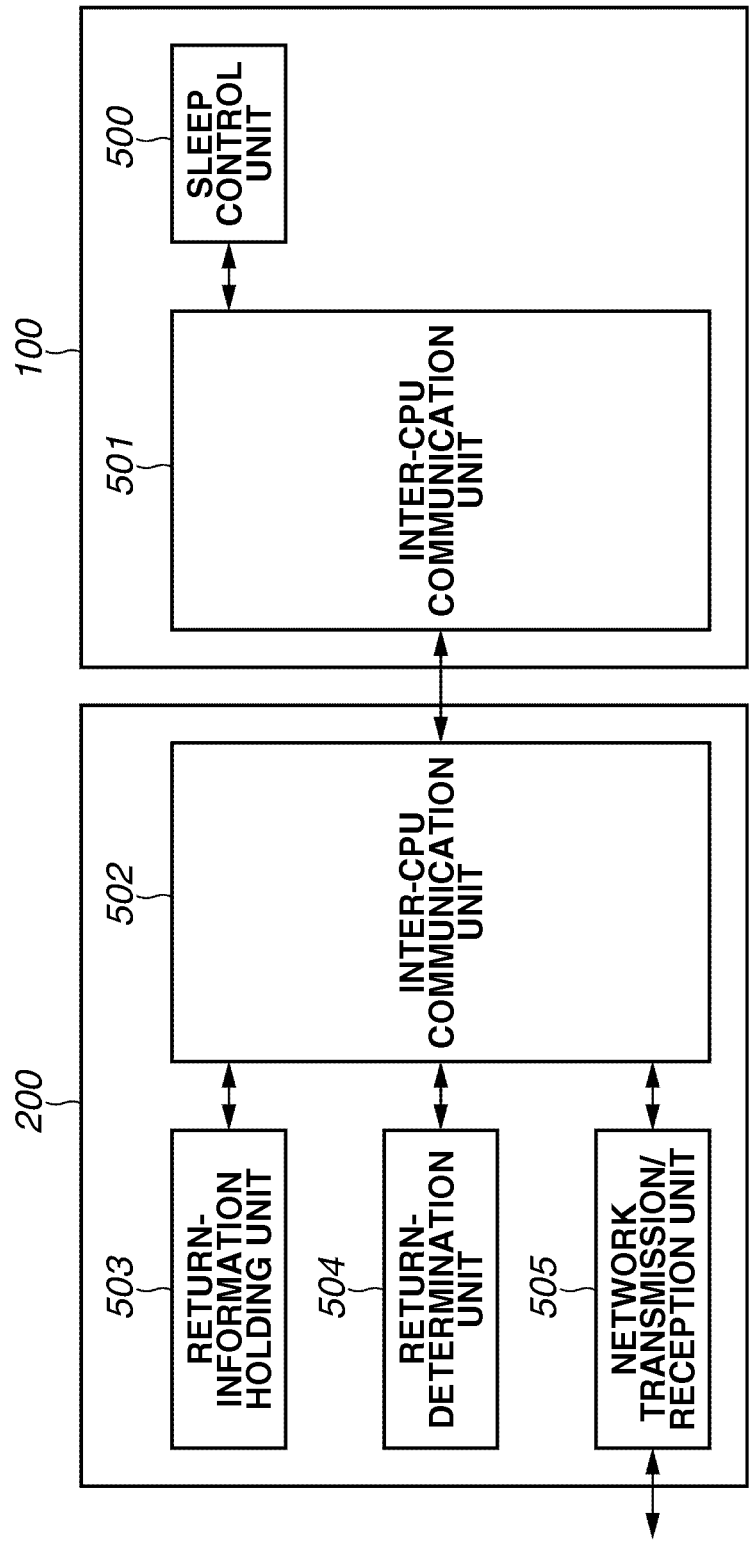
FIG. 8 is a block diagram illustrating a software configuration according to a second exemplary embodiment.

FIG. 8 is a block diagram illustrating a software configuration relating to communication between the total control unit 100 and the communication control unit 200, and the power-saving mode. Respective functional components illustrated in FIG. 8 are realized by executing respective programs by the CPUs 101 and 201.

A sleep control unit 500 detects that condition for shifting to the power-saving mode has been satisfied, or condition for returning to the normal power mode has been satisfied, and performs switching control between the normal power mode and the power-saving mode. While shifting to the power-saving mode from the normal power mode, the sleep control unit 500 holds information which the total control unit 100 has operated so far, in the storage device 13 or the nonvolatile memory 14.

Inter-CPU communication units 501 and 502 perform control of data communication between the CPUs 101 and 201.

A return-information holding unit 503, when the information processing apparatus 10 is shifted to the power-saving mode, receives and holds return-condition information sent from the total control unit 100.

A return-determination unit 504, in a state where the information processing apparatus 10 has been shifted to the power-saving mode, analyzes a packet which a network transmission/reception unit 505 receives. Then, the return-determination unit 504 determines whether the received packet is the one which satisfies the condition indicated by the information held in the return information holding unit 503.

Then, based on this determination result, the return-determination unit 504 determines whether the received packet should be processed on the total control unit 100 side, or whether the information processing apparatus 10 is to be returned to the normal power mode.

If it is determined that the received packet should be processed on the total control unit 100 side, or if it is determined that the information processing apparatus 10 is to be returned to the normal power mode, the return-determination unit 504 instructs the power source unit 11 to return to the normal power mode.

Further, the received packet is transferred to the total control unit 100. The communication control unit 200, after it has been determined that the information processing apparatus 10 is to be returned to the normal power mode, is shifted to the monitoring mode described in the first exemplary embodiment. The details of operation of the monitoring mode in the present exemplary embodiment will be described below.

The total control unit 100, when performing return to the normal power mode, performs re-setting on areas where setting information has been lost. In the present exemplary embodiment, the setting information of the storage device 13 and the main memory 104 are assumed to be lost. As a matter of course, the present exemplary embodiment is not limited to this.

In a case where the information processing apparatus 10 operates in the normal power mode, the packet which the network transmission reception unit 505 receives is directly transferred to the total control unit 100, without making determination in the return-determination unit 504.

Hereinbelow, the operation in a case where a trouble has occurred in the total control unit 100 when the information processing terminal 300-1 is shifted to the normal power mode from the power-saving mode will be described in detail with reference to FIG. 9.

Figure 9:
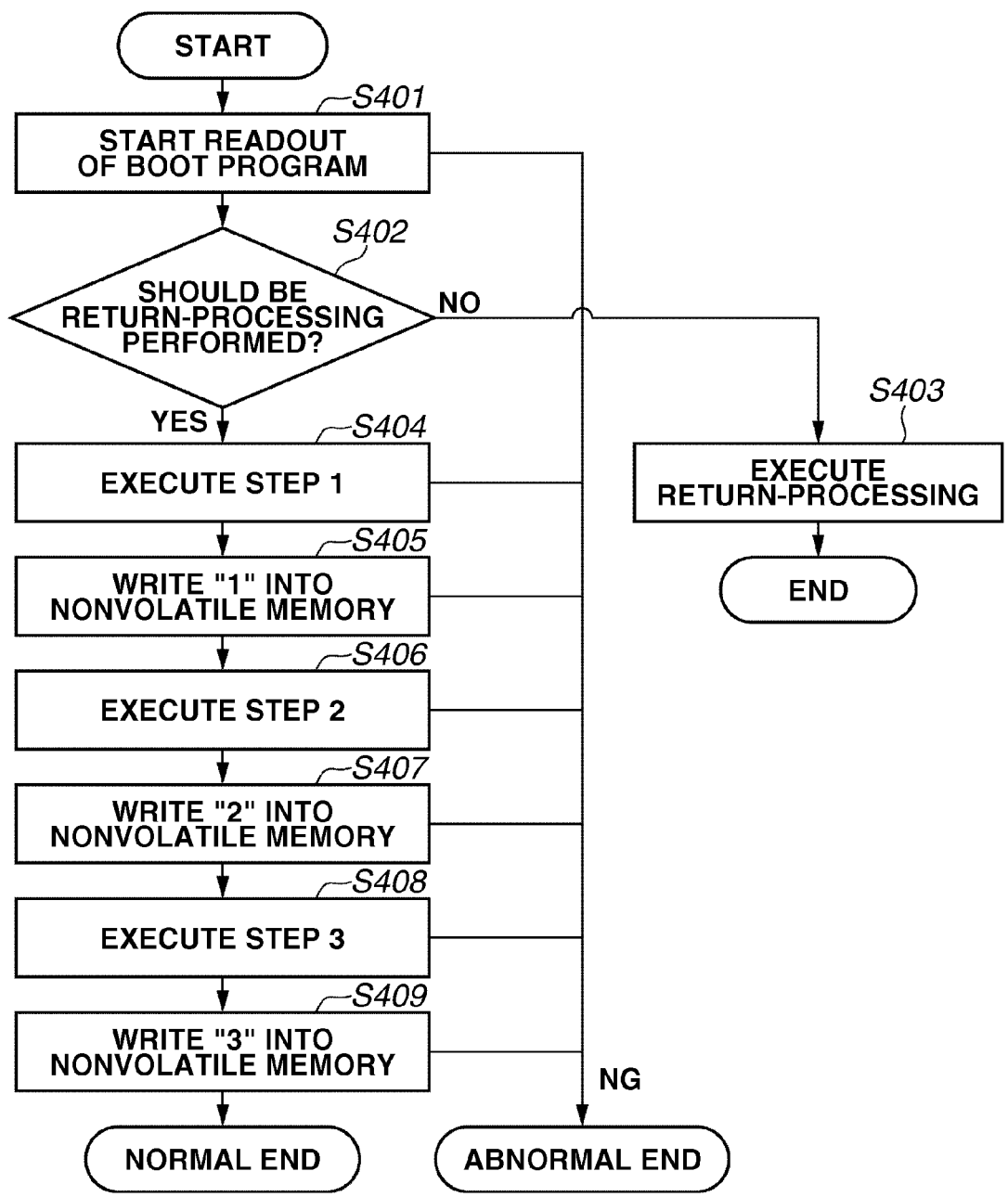
FIG. 9 is a flowchart illustrating an operation of a total control unit according to the second exemplary embodiment.

Referring to FIG. 9, processing performed by the total control unit 100 when returning to the normal power mode will be described. Hereinbelow, in the present exemplary embodiment, the processing performed by the total control unit 100 when returning to the normal power mode will be described as "return processing". FIG. 9 illustrates a flowchart relating to the return processing of the total control unit 100.

When the power is supplied, in step S401, the CPU 101 of the total control unit 100 starts to read out the boot program stored in the boot ROM 103. In the present exemplary embodiment, in step S402, the CPU 101 determines whether the return processing should be now performed or the startup processing should be performed, in the boot program. As a determination method, information may be written while shifting to the power-saving mode in a predetermined area of the nonvolatile memory 14, or the information may be read out while returning to the normal power mode, or other methods may be used.

If it is determined that startup processing should be performed (YES in step S402), in step S403, the startup processing is performed. If it is determined that return processing should be performed (NO in step S402), the return processing is performed.

Hereinbelow, procedure for the return processing will be described specifically. In the present exemplary embodiment, the return processing is divided into three steps, and when each step ends, writing is performed into the nonvolatile memory 14.

The description of each of three steps will be made. In step 1, initialization of the main memory 104 is performed. In step 2, initialization of the storage device 13 is performed. In step 3, loading of an OS from the storage device 13 is performed. By separating the return processing by steps in this way, correspondence between a stopped step and a part with a failure possibility is made clear. A correspondence list between stopped steps, and part IDs with a failure possibility is illustrated in FIG. 10.

In step S404, the CPU 101 executes step 1. When step 1 ends, in step S405, the CPU 101 writes predetermined data (for example, 1) in a predetermined area (for example, address 0) of the nonvolatile memory 14.

Next, in step S406, the CPU 101 executes step 2. When step 2 ends, in step S407, the CPU 101 writes predetermined data (for example, 2) in a predetermined area (for example, address 0) of the nonvolatile memory 14.

Next, in step S408, the CPU 101 executes step 3. When step 3 ends, in step S409, the CPU 101 writes predetermined data (for example, 3) in a predetermined area (for example address, 0) of the nonvolatile memory 14. When step 3 ends, the return processing of the total control unit 100 is completed.

Further, if normal end fails, in all steps (NG in FIG. 9), the CPU 101 cannot end the return processing and comes to an abnormal end.

Figure 11:
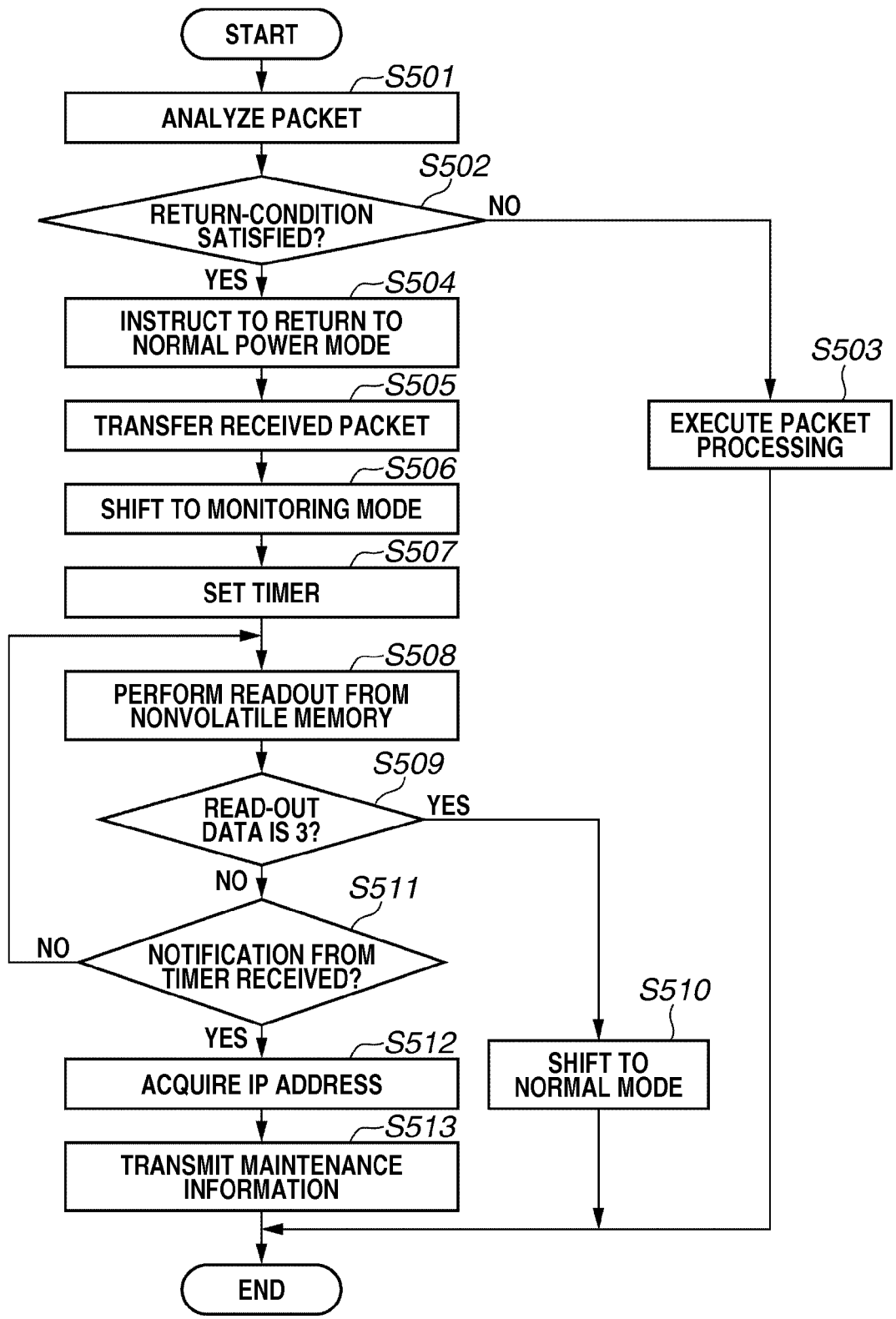
FIG. 11 is a flowchart illustrating an operation of a communication control unit according to the second exemplary embodiment.

FIG. 11 is a flowchart illustrating an operation of the communication control unit 200 in the power-saving mode according to the present exemplary embodiment. The operations described in the flowchart can be realized by the CPU 201 executing a program of software configuration illustrated in FIG. 8.

In step S501, the CPU 201 of the communication control unit 200, which is in the power-saving mode, analyzes a packet which the communication unit 206 receives. Then, in step S502, the CPU 201 determines whether the received packet satisfies the return condition held in the main memory 204. If the return condition is not satisfied (NO in step S502), in step S503, the CPU 201 executes specified processing such as discarding the received packet, or transferring it over the network, and ends the processing.

If the return condition is satisfied (YES in step S502), in step S504, the CPU 201 instructs the power source unit 11 to return to the normal power mode. In step S505, the CPU 201 transfers the received packet to the total control unit 100.

Then, in step S506, the communication control unit 200 is shifted to the monitoring mode. In step S507, the timer 205 is set to perform notification to the CPU 201 after the predetermined time has elapsed.

In the present exemplary embodiment, the predetermined time to be set in the timer 205 is made sufficiently longer than the time taken for the total control unit 100 to complete the startup. Accordingly, if the return processing of the total control unit 100 has not been completed, before a notification from the timer 205 is received, it is determined that a trouble has occurred.

Next in step S508, the CPU 201 performs readout of a predetermined area (for example, address 0) of the nonvolatile memory 14. The address to be read out is identical to an address which the CPU 101 of the total control unit 100 performs writing during the return processing. As a method for identifying the address to be read out, an address to be accessed may have been written into a different area of the nonvolatile memory 14, and the CPU 101 and the CPU 201 may read out the address, or an address to be accessed to the program itself may be written.

In step S509, the CPU 201 analyzes the read-out data, and checks to which step the return processing of the total control unit 100 has progressed. More specifically, if the read-out data is 1, it can be determined that the return processing of the total control unit 100 has completed step 1. Similarly, in the present exemplary embodiment, since data to be written is 3 when the return processing of the total control unit 100 has been completed, in step S509, the CPU 201 determines whether the read-out data is 3.

If the read-out data is 3 (YES in step S510), the CPU 201 can determine that the return processing of the total control unit 100 has been completed. Therefore, in step S510, the CPU 201 shifts the operation mode to the normal mode from the monitoring mode, and completes the processing for shifting the communication control unit 200 to the normal power mode from the power-saving mode.

On the other hand, if the read-out data is not 3 (NO in step S510), in step S511, the CPU 201 determines whether a notification from the timer 205 is received. If a notification has not been received (NO in step S511), the process returns to step S508, and if a notification has been received (YES in step S511), the CPU 201 determines that a trouble has occurred when the total control unit 100 is returned to the normal power mode.

At this time, in step S512, the CPU 201 first reads out a predetermined area (for example, address 4) of the nonvolatile memory 14, and acquires an IP address of the local monitoring terminal 301. Next, in step S513, the CPU 201 transmits maintenance information including data indicating to which step the return processing read out in step S508 has progressed, to the local monitoring terminal 301 via the communication unit 206 using the IP address acquired in step S512.

Information indicating whether a trouble has occurred in the startup processing or in the return processing is to be included in the maintenance information.

As described above, the local monitoring terminal 301, upon receiving the maintenance information including information indicating that a trouble has occurred during the startup from the information processing apparatus 300-n, immediately notifies the management terminal 304 accordingly.

The operation performed when the management terminal 304 receives the maintenance information is nearly identical to that in the first exemplary embodiment. As a difference, the management terminal 304 reads out information indicating whether a trouble of the information processing apparatus 10 included in the received maintenance information has occurred in the startup processing or in the return processing.

As described above, in the present exemplary embodiment, two operation modes of the monitoring mode and the normal mode are provided in the communication control unit 200, and there has been illustrated an example in which the operation mode is shifted to the monitoring mode while returning from the power-saving mode. Accordingly, it becomes possible to monitor a trouble which occurs while the information processing apparatus 10 is returned from the power-saving mode, and notify an administrator of the content thereof.

Further, a packet reception is not the only return-factor from the power-saving mode. Other conditions for returning to the normal power mode from the power-saving mode include input by a user, for example, pressing a power switch. Thus, it is a possible to hold "a correspondence list between stopped steps and part IDs with a failure possibility", which differs from return-factor to return-factor.

More specifically, in a case where input by the user has become a return-factor, a step such as the one indicating whether display processing of a display (not illustrated) has come to an normal end, is added to the list illustrated in FIG. 10. In this way, by holding the "correspondence list between stopped steps and part IDs with a failure possibility" which differs from return-factor to return-factor, it becomes possible to add detailed trouble information corresponding to the return-factor to the maintenance information.

Hereinbelow, a third exemplary embodiment will be described with reference to FIG. 12 to FIG. 14. In the present exemplary embodiment, in a case where a trouble has occurred halfway through the startup especially due to power-on of the printing apparatus, an example for printing and notifying the trouble information will be described.

Figure 12:
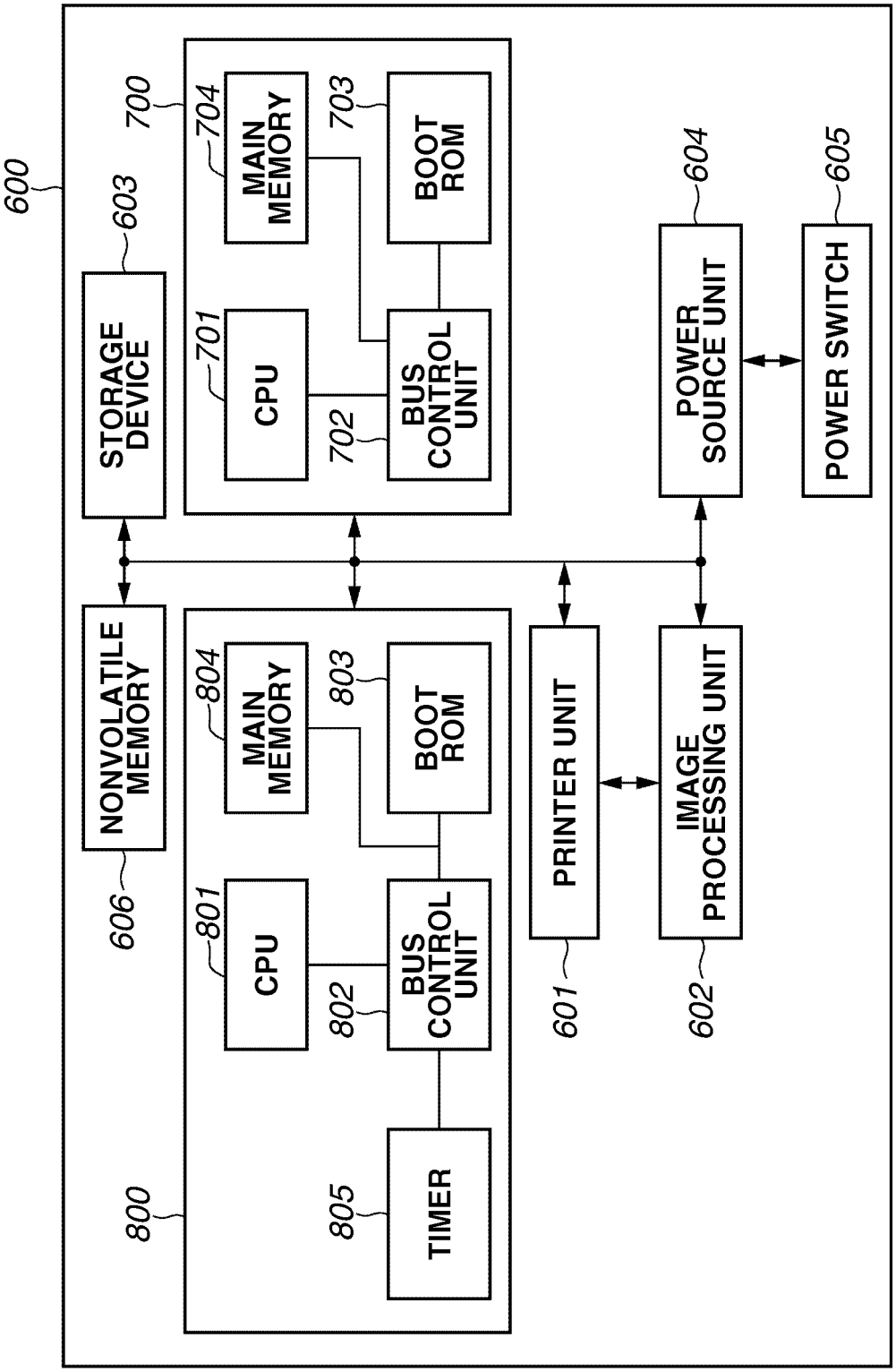
FIG. 12 is a block diagram illustrating a hardware configuration of a printing apparatus according to an exemplary embodiment.
Figure 13:
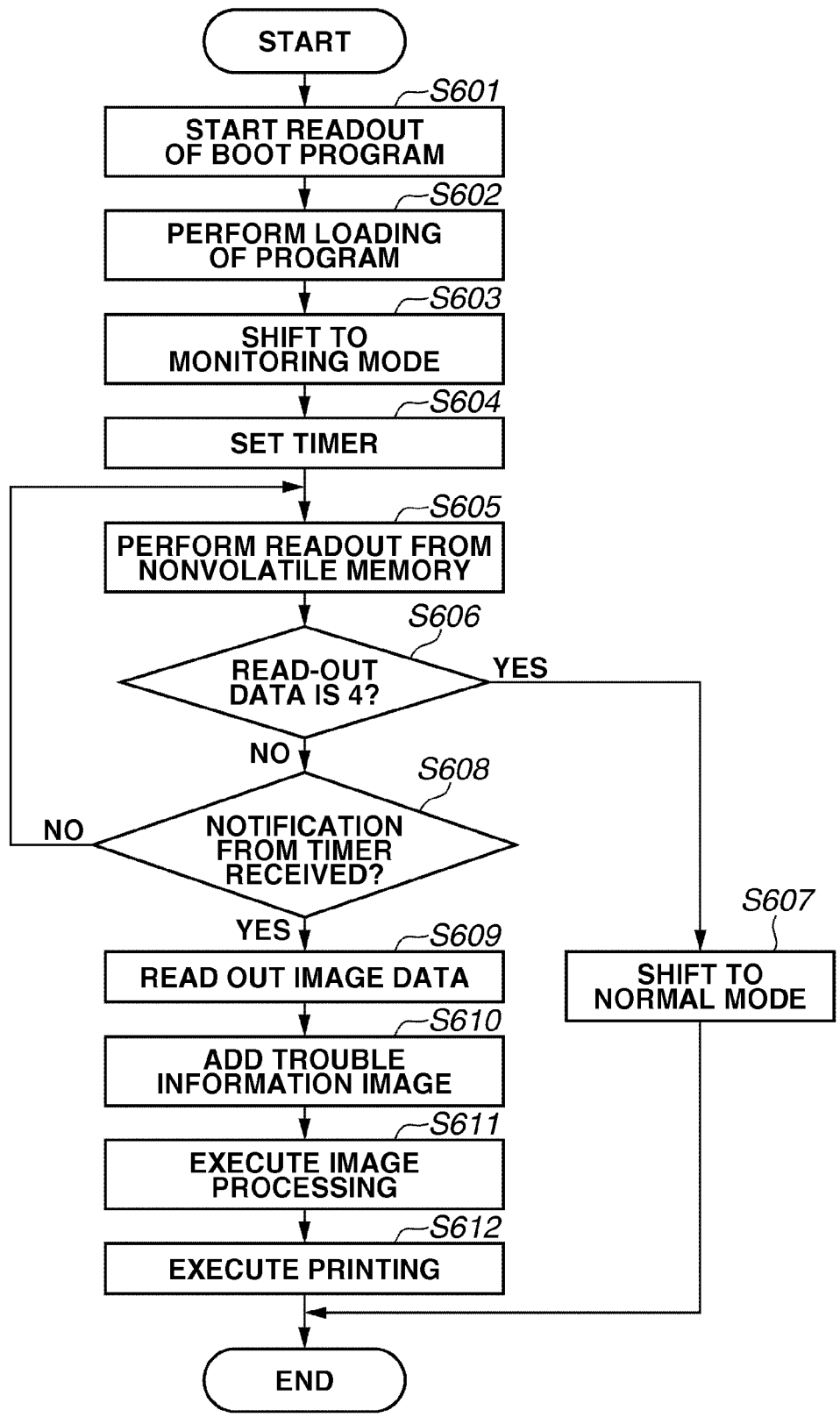
FIG. 13 is a flowchart illustrating an operation of a printing control unit according to a third exemplary embodiment.

FIG. 12 is a block diagram illustrating an example configuration of a printing apparatus 600 according to the present exemplary embodiment. The printing apparatus 600 includes a total control unit 700, a printing control unit 800, a printer unit 601, an image processing unit 602, a storage device 603, a power source unit 604, a power switch 605, and a nonvolatile memory 606.

The total control unit 700 is constituted of a CPU and a memory and so forth, and performs control of the entire printing apparatus. The printing control unit 800 is constituted of a CPU and a memory and so forth, and performs control of the printer unit. The printer unit 601 is a block where an electrical image signal is printed on a recording paper as a visible image, and is constituted by a laser beam printer or an inkjet printer.

The image processing unit 602 is a block where recording image processing is performed. The recording image processing is used to perform resolution conversion on image data to match recording resolution, which includes converting the image data into high-definition image data, by subjecting the image data to various types of image processing such as scaling, smoothing, density correction of images, and outputting to the laser beam printer or the like. The storage device 603 is a memory device such as an HDD, which not only temporarily stores the image data, but also stores programs and data to be executed by the total control unit 700.

Further, the printing apparatus 600 includes the power source unit 604 that supplies power to respective units in the information processing apparatus, and the power switch 605 that accepts power-on operation by the user. Furthermore, the printing apparatus 600 includes the nonvolatile memory 606 for storing therein data to be notified to the printing control unit 800 while starting up the total control unit 700. Further, the printing apparatus 600 is configured so that power can be supplied from the power source unit 604 to respective components.

The total control unit 700 includes a CPU 701 that performs arithmetic processing or the like, a bus control unit 702 that controls an address bus and a data bus, a boot ROM 703 that stores therein a total control unit boot program (not illustrated), and a main memory 704, and the respective components are connected to one another by buses. In FIG. 12, only a data bus is illustrated.

The total control unit boot program stored in the boot ROM 703 performs initialization of respective units of hardware in the printing apparatus 600 and loading of the OS and the like. Further, in the boot program, when a predetermined step has reached, data to identify a step which has reached a predetermined area of the nonvolatile memory 606, is written. As a matter of course, the data may be written in the storage device 603, or may be directly notified to the printing control unit 602.

The main memory 704 is a random access memory (RAM), and is a work memory of the CPU 701.

The printing control unit 800 includes a CPU 801 that performs arithmetic processing and the like, a bus control unit 802 that controls an address bus and a data bus. Further, the printing control unit 800 includes a boot ROM 803 that stores therein a printing control unit boot program (not illustrated), a main memory 804, and a timer 805, and the respective components are connected to one another by buses.

In FIG. 12, only a data bus is illustrated. The boot program stored in the boot ROM 803 is used to perform initialization of respective units of hardware within the printing control unit 800 and loading of the OS and so forth. The main memory 804 is a random access memory, and is a work memory of the CPU 801. The timer 805 has a function of notifying the CPU 801 after a certain period of time has elapsed.

The printing apparatus 600 holds image data containing trouble information to be printed when a trouble occurs during the startup of the total control unit 700 in the nonvolatile memory 608. As a matter of course, the image data may be held in other memories such as the storage device 605.

Hereinbelow, the operation in a case where a trouble has occurred in the total control unit 700 while supplying power to the printing apparatus 600 will be described in detail with reference to FIG. 12.

When the power switch 605 is turned on, the power source unit 604 is notified accordingly, and the power source unit 604 supplies power to respective components. When the power is supplied, the total control unit 700 and the printing control unit 800 start the startup processing. A flow of the startup processing of the total control unit 700 is basically identical to that in FIG. 4. In short, the total control unit 700 executes four divided steps, and when each step ends, the total control unit 700 performs the writing into the nonvolatile memory 606.

Each of four steps will be described. In step 1, initialization of inside the CPU 701 is performed. In step 2, initialization of the main memory 704 is performed. In step 3, initialization of the storage device 603 is performed. In step 4, loading of the OS is performed from the storage device 603. In this way, by dividing the startup processing into four steps, a correspondence between a stopped step and a part with a failure possibility is made clear. A correspondence list of the stopped steps and part IDs with a failure possibility is similar to that in FIG. 5.

Next, the startup processing of the printing control unit 800 will be described. FIG. 13 illustrates a flowchart relating to the startup processing of the printing control unit 800.

When the power is supplied, in step S601, the CPU 801 of the printing control unit 800 starts to read out the boot program stored in the boot ROM 803. Next, in step S602, the CPU 801 performs initialization inside the printing control unit 800 according to the boot program, and performs loading of the program.

Thereafter, in step S603, the printing control unit 800 is shifted to an operation mode called a monitoring mode in the present exemplary embodiment. The printing control unit 800 operates in the monitoring mode until the startup processing of the total control unit 700 is completed. After completion, the printing control unit 800 operates in a mode for performing print control according to a print request as usual (normal mode).

When the CPU 801 is shifted to the monitoring mode, in step S604, the timer 805 is set to notify the CPU 801 after a predetermined time has elapsed. In the present exemplary embodiment, the predetermined time to be set for the timer 805 is made sufficiently longer than the time taken for the total control unit 700 to complete the startup.

Accordingly, if the startup processing of the total control unit 700 has not been completed before a notification is received from the timer 805, it can be determined that trouble has occurred. As a matter of course, when the predetermined time to be set for the timer 805 is made shorter than the time taken for the total control unit 700 to complete the startup, and notifications have been received a predetermined number of times, it may be determined that trouble has occurred in the total control unit 700.

Next, in step S605, the CPU 801 performs readout of a predetermined area (for example address 0) of the nonvolatile memory 606. An address to be read out, as described above in other exemplary embodiments, is made identical to an address which the CPU 701 of the total control unit 700 performs writing during the startup processing.

In step S606, the CPU 801 analyzes the read-out data, and checks to which step the startup processing of the total control unit 700 has progressed. More specifically, if the read-out data is 1, it can be determined that the startup processing of the total control unit 700 has completed step 1. Similarly, in the present exemplary embodiment, the data to be written is 4 when the startup processing of the total control unit 700 has been completed. Therefore, in step S606, the CPU 801 determines whether the read-out data is 4.

If the read-out data is 4 (YES in step S606), the CPU 801 can determine that the startup processing of the total control unit 700 has been completed. Therefore, in step S607, the CPU 801 shifts the operation mode to the normal mode from the monitoring mode, and completes the startup processing of the printing control unit 800.

On the other hand, if the read-out data is not 4 (NO in step S606), in step S608, the CPU 801 determines whether a notification from the timer 805 is received. If the notification has not been received (NO in step S608), the processing returns to step S605. If the notification has been received (YES in step S608), the CPU 801 determines that a trouble has occurred during the startup of the total control unit 700.

At this time, in step S609, the CPU 801 first reads out a predetermined area (for example, address 4) of the nonvolatile memory 606, and reads out image data. In the image data, contact information of a provider, which manages the printing apparatus, is included. Next, in step S610, the CPU 801 adds a trouble information image corresponding to the data read out in step S605, to the read-out print image.

FIG. 14 illustrates an image to be printed in a case where the read-out data is 1, i.e., trouble has occurred between step 1 and step 2 in the total control unit 700. As illustrated in FIG. 14, in the present exemplary embodiment, by displaying a list of parts with a failure possibility corresponding to the step where trouble occurs, a provider just has to prepare only necessary parts when visiting a place where the printing apparatus is installed.

Next, in step S611, the CPU 801 transmits image data including the trouble information image to the image processing unit 602, and executes image processing. Finally, in step S612, the CPU 801 transmits the image data which has undergone image processing to the printer unit 601, and executes printing.

As described above, by providing the printing control unit 800 with two operation modes of the monitoring mode and the normal mode, it becomes possible to monitor a trouble which occurs during the startup, and to print the content thereof, without including a dedicated monitoring control unit.

It is also possible to apply the control according to the second exemplary embodiment described above to the present exemplary embodiment. More specifically, a trouble which has occurred when the printing apparatus is returned to the normal power mode from the power-saving mode, is printed out in the form of a report as illustrated in FIG. 14, rather than being notified externally.

Hereinbelow, a fourth exemplary embodiment will be described with reference to FIG. 15. In the present exemplary embodiment, an example is described in which the communication control unit 200 of the information processing apparatus 10 controls power source of the total control unit 100, and notifies a trouble which has occurred halfway through the startup.

Configurations of the information processing apparatus 10, the communication system 1000, the local monitoring terminal 301, and the management terminal 304, in the present exemplary embodiment are identical to those in the first exemplary embodiment. However, the power source unit 11, when the power switch 12 is turned on, does not supply the power to the total control unit 100.

Hereinbelow, the operation in a case where a trouble has occurred in the total control unit 100 during the power supply to the information processing terminal 300-1 will be described in detail with reference to FIG. 15.

When the power switch 12 is turned on, the power source unit 11 is notified thereof, and the power source unit 11 supplies power to respective components except for the total control unit 100. When power is supplied, the communication control unit 200 starts the startup processing.

Figure 15:
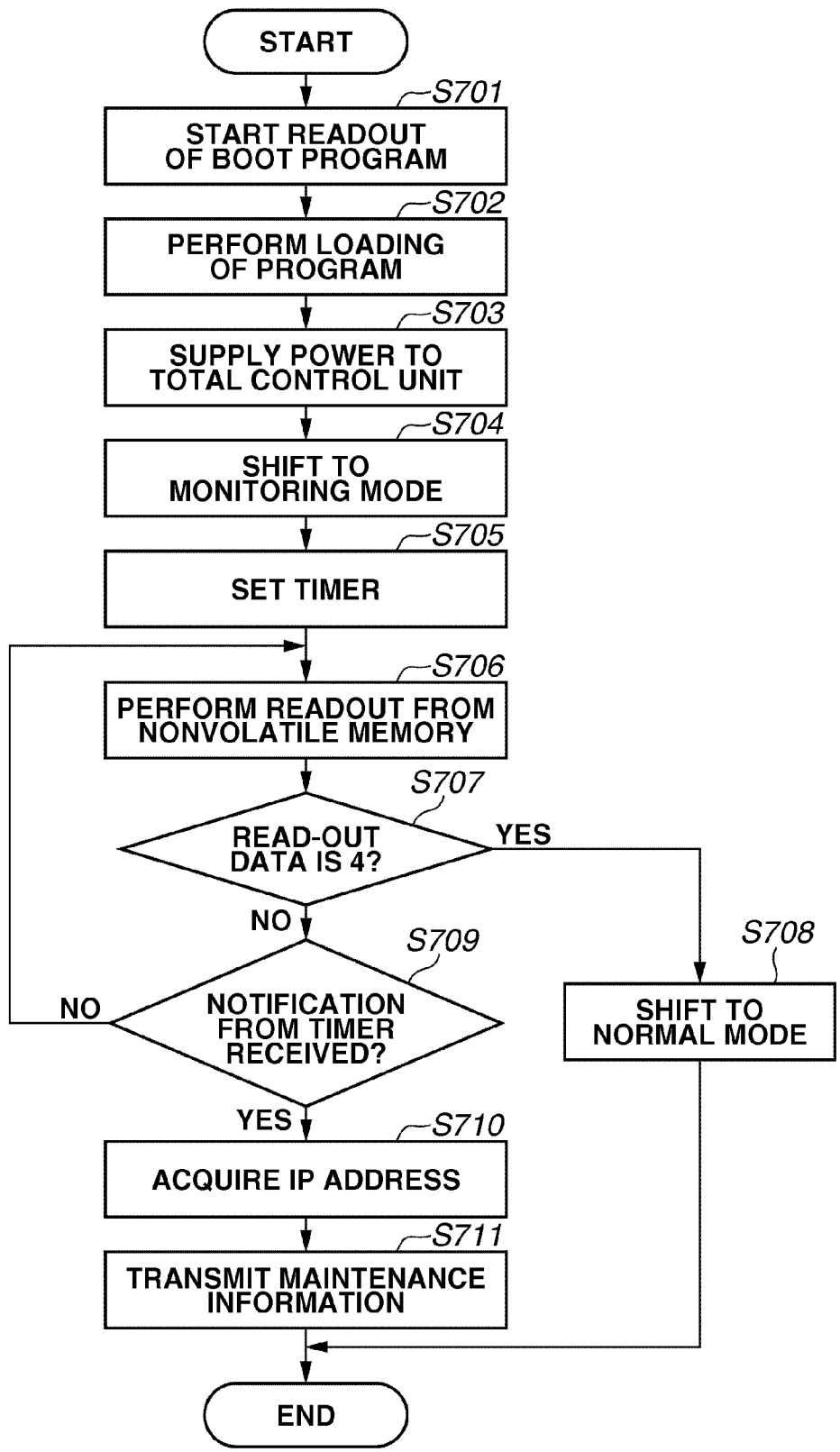
FIG. 15 is a flowchart illustrating an operation of a communication control unit according to a fourth exemplary embodiment.

Referring to FIG. 15, the startup processing of the communication control unit 200 will be described. FIG. 15 illustrates a flowchart relating to the startup processing of the communication control unit 200.

When power is supplied, in step S701, the CPU 201 of the communication control unit 200 starts to read out a boot program stored in the boot ROM 203. Next, in step S702, the CPU 201 performs initialization inside the communication control unit 200 according to the boot program, and performs loading of the program. Thereafter, in step S703, the communication control unit 200 controls the power source unit 11, and supplies power to the total control unit 100.

Next, in step S704, the communication control unit 200 is shifted to the monitoring mode until the startup processing of the total control unit 100 is completed. When shifting to the monitoring mode, in step S705, the CPU 201 sets the timer 205 to notify the CPU 201 after a predetermined time has elapsed.

In the present exemplary embodiment, the predetermined time to be set for the timer 205 is made sufficiently longer than the time taken for the total control unit 100 to complete the startup. Accordingly, if the startup processing of the total control unit 100 has not been completed before a notification from the timer 205 is received, it can be determined that a trouble has occurred. As a matter of course, when the predetermined time to be set for the timer 205 is made shorter than the time taken for the total control unit 100 to complete the startup, and notifications have been received a predetermined number of times, it may be determined that trouble has occurred in the total control unit 100.

Next, in step S706, the CPU 201 performs readout of a predetermined area (for example, address 0) of the nonvolatile memory 14. An address to be read out, as described above in other exemplary embodiments, is made identical to an address at which the CPU 101 of the total control unit 100 performs writing during the startup processing.

In step S707, the CPU 201 analyzes the read-out data, and checks to which step the startup processing of the total control unit 100 has progressed. More specifically, if the read-out data is 1, it can be determined that step 1 of the startup processing of the total control unit 100 has been completed. In the present exemplary embodiment, the data to be written is 4 when the startup processing of the total control unit 100 has been completed. Therefore, in step S707, the CPU 201 determines whether the read-out data is 4.

If the read-out data is 4 (YES in step S707), in step S708, since it can be determined that the startup processing of the total control unit 100 has been completed, the CPU 20 shifts the operation mode to the normal mode from the monitoring mode, and ends the startup processing of the communication control unit 200.

On the other hand, in step in S707, if the read-out data is not 4 (NO in step S707), in step S709, the CPU 201 determines whether a notification from the timer 205 is received. If a notification has not been received (NO in step S709), the processing returns to step S706. If a notification has been received (YES in step S709), the CPU 201 determines that trouble has occurred during the startup of the total control unit 100.

At this time, in step S710, the CPU 201 reads out a predetermined area (for example, address 4) of the nonvolatile memory 14, and acquires an IP address of the local monitoring terminal 301. Next, in step S711, the CPU 201 transmits the maintenance information including the data, read out in step S707, indicating to which step the startup processing has progressed, to the local monitoring terminal 301 via the communication unit 206 using the IP address acquired in step S710.

Figure 4:
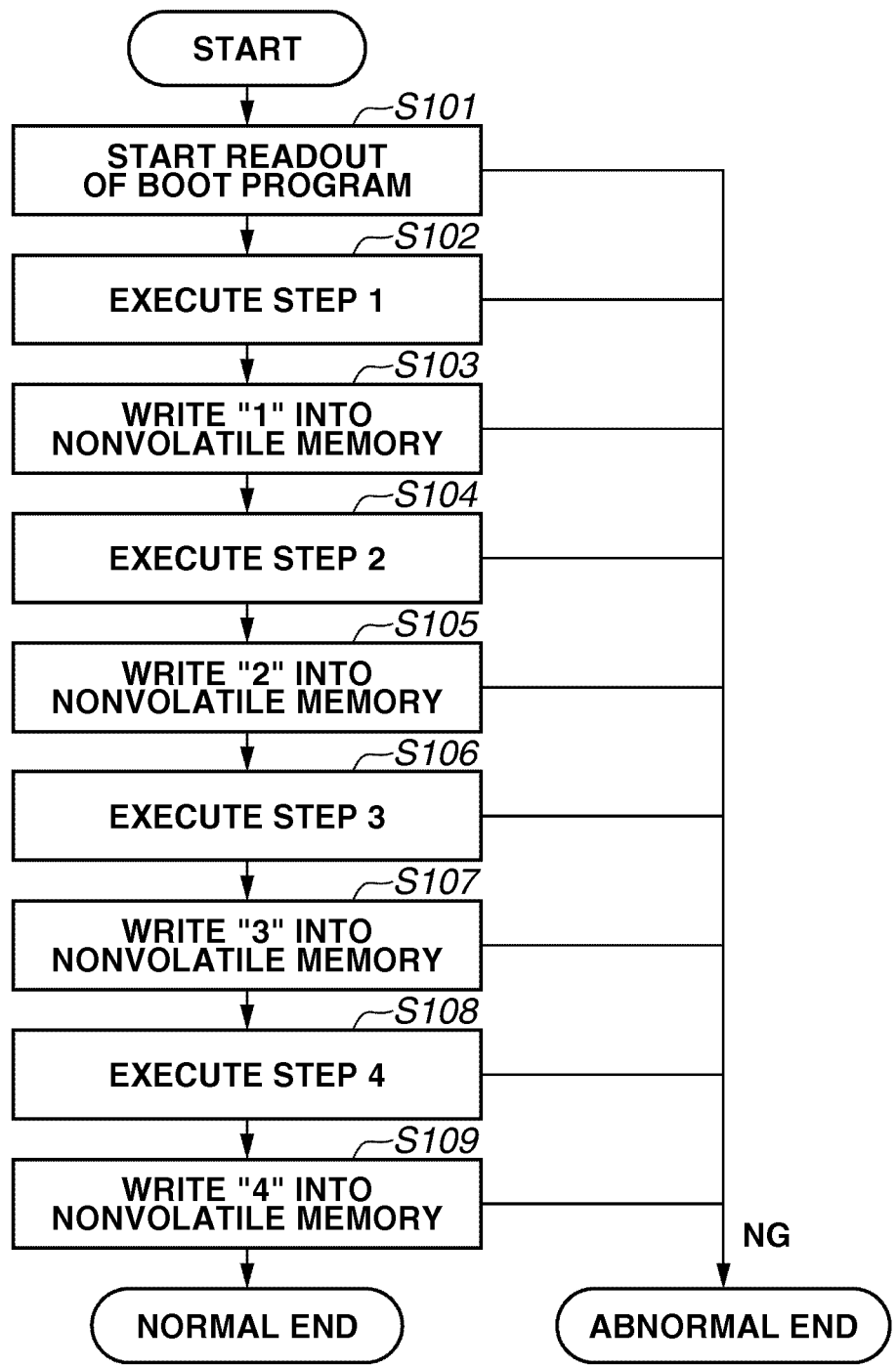
FIG. 4 is a flowchart illustrating an operation of a total control unit according to a first exemplary embodiment.

The processing of the total control unit 100 is similar to that in the flowchart illustrated in FIG. 4. Further, an operation when receiving the maintenance information by the management terminal 304 is similar to the flowchart illustrated in FIG. 7.

As described above, even in a configuration in which power is supplied ahead of the communication control unit 200, it becomes possible to monitor a trouble which may occurs during the startup, and notify an administrator of the content thereof, without including a dedicated monitoring control unit.

Further, the present exemplary embodiments can be also realized by executing the following processing. This is, the processing for supplying software (program) which realizes the functions of the above-described exemplary embodiments to a system or an apparatus via a network or various types of storage media, and causing a computer (or a CPU or a microprocessing unit (MPU)) of the system or the apparatus to read and execute the program. In an example, a computer-readable storage medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-140880 filed Jun. 24, 2011, which is hereby incorporated by reference herein in its entirety.

What is claimed is:

1. An information processing apparatus comprising:
a control unit configured to perform control of entire information processing apparatus; and
a communication control unit configured to operate as a normal mode for transmitting and receiving information concerning the information processing apparatus via a network,
wherein, at a time of startup of the information processing apparatus, the control unit executes sequentially, a plurality of processing which the control unit should perform at the time of startup, and writes information indicating that processing has been completed into a predetermined storage area each time processing is completed,
wherein, at the time of startup of the information processing apparatus, an operation mode of the communication control unit is shifted to a monitoring mode,
wherein the communication control unit, which has been shifted to the monitoring mode, monitors occurrence of abnormality at the time of startup, based on presence/absence of writing of information indicating that processing to be executed last among the plurality of processing has been completed, into the predetermined storage area,
wherein, in response to abnormality having occurred, the communication control unit, which has been shifted to the monitoring mode, outputs occurrence of the abnormality to a network, and
wherein, in response to information, which indicates that processing to be executed last among the plurality of processing has been completed without occurrence of any abnormality, being written into the predetermined storage area, the operation mode of the communication control unit is shifted to the normal mode from the monitoring mode.

2. The information processing apparatus according to claim 1, wherein the startup of the information processing apparatus is power-on or return from a power-saving mode to a normal power mode of the information processing apparatus.

3. The information processing apparatus according to claim 1,
wherein the startup of the information processing apparatus is return from a power-saving mode to a normal power mode of the information processing apparatus, and
wherein the plurality of processing which the control unit should perform at the time of the startup varies, depending on factors of the return.

4. The information processing apparatus according to claim 1, wherein the information processing apparatus is an image forming apparatus provided with at least one of a print unit and a scanner unit.

5. A method for an information processing apparatus including a control unit for performing control of entire information processing apparatus, and a communication control unit that operates as a normal mode for transmitting and receiving information concerning the information processing apparatus via a network, the method comprising:
executing sequentially, at a time of startup of the information processing apparatus, a plurality of processing which the control unit should perform at the time startup, and writing information indicating that processing has been completed into a predetermined storage area each time processing is completed;
shifting an operation mode of the communication control unit to a monitoring mode at the time of startup of the information processing apparatus;
monitoring occurrence of abnormality at the time of startup, based on presence/absence of writing of information indicating that processing to be executed last among the plurality of processing has been completed into a predetermined storage area, while in the monitoring mode, by the communication control unit;
outputting occurrence of abnormality to a network at the time of occurrence of abnormality, by the communication control unit; and shifting the operation mode of the communication control unit to the normal mode from the monitoring mode, in response to information, which indicates that processing to be executed last among the plurality of processing has been completed without occurrence of any abnormality, being written into the predetermined storage area.

6. The method according to claim 5, wherein the startup of the information processing apparatus is power-on or return from a power-saving mode to a normal power mode of the information processing apparatus.

7. The method according to claim 6, wherein the startup of the information processing apparatus is return from a power-saving mode to a normal power mode of the information processing apparatus, and wherein a plurality of processing which the control unit should perform at the time of startup varies, depending on factors of the return from the power-saving mode to the normal power mode.

8. The method according to claim 5, wherein the information processing apparatus is an image forming apparatus including at least one of a print unit and a scanner unit.

9. A printing apparatus comprising:
a control unit for performing control of entire printing apparatus; and
a printing control unit configured to operate as a normal mode for performing print processing according to a print request, wherein, at a time of startup of the printing apparatus, the control unit executes sequentially a plurality of processing which the control unit should perform at the time startup, and writes information indicating that processing has been completed into a predetermined storage area, each time processing is completed wherein, at the time of startup of the printing apparatus, an operation mode of the printing control unit is shifted to a monitoring mode, wherein the printing control unit, which has been shifted to the monitoring mode, monitors occurrence of abnormality at the time of startup, based on presence/absence of writing of information indicating that processing to be executed last among the plurality of processing has been completed into the predetermined storage area, wherein, in response to abnormality having occurred, the printing control unit, which has been shifted to the monitoring mode, performs printout indicating occurrence of the abnormality, and wherein, in response to information, which indicates that processing to be executed last among the plurality of processing has been completed without occurrence of any abnormality, being written into the predetermined storage area, the operation mode of the printing control unit is shifted to the normal mode from the monitoring mode.

* * * * *